United States Patent [19]

Kalmanash

[11] Patent Number: 4,877,307
[45] Date of Patent: Oct. 31, 1989

[54] STEREOSCOPIC DISPLAY

[75] Inventor: Michael H. Kalmanash, Los Altos, Calif.

[73] Assignee: Kaiser Aerospace & Electronics Corporation, Oakland, Calif.

[21] Appl. No.: 215,260

[22] Filed: Jul. 5, 1988

[51] Int. Cl.⁴ .................. G02B 27/26; H04N 13/00
[52] U.S. Cl. ........................... 350/132; 358/88; 358/92
[58] Field of Search .............. 350/132, 130; 358/88, 358/91, 92

[56] References Cited

U.S. PATENT DOCUMENTS

| | | | | |
|---|---|---|---|---|
| 4,281,341 | 7/1981 | Byatt | 350/132 X |
| 4,431,265 | 2/1984 | Banton | 350/132 |
| 4,559,556 | 12/1985 | Wilkins | 350/132 X |
| 4,719,507 | 1/1988 | Bos | 350/132 X |

Primary Examiner—Scott J. Sugarman
Attorney, Agent, or Firm—Marvin H. Kleinberg; Don C. Lawrence

[57] ABSTRACT

A stereoscopic display capable of displaying monochromatic or colored views of moving, three dimensional scenes comprises means for sequentially projecting alternate ones of successive pairs of substantially monochromatic images corresponding to right-eye and left-eye perspectives of the scene at a display rate sufficient to avoid a perception of flicker in the images. A variable polarizer is used to circularly polarize alternate ones of the images in respectively opposite senses synchronously at their projection rate. The images are analyzed by highly-transmissive eyewear comprising at least one pair of oppositely-sensed cholesteric liquid crystal circular polarizers tuned to the particular color wavelength of the images and disposed, one over each eye, to transmit appropriately-polarized images to corresponding eyes and to reflect inappropriately-polarized images away therefrom.

17 Claims, 2 Drawing Sheets

U.S. Patent    Oct. 31, 1989    Sheet 2 of 2    4,877,307
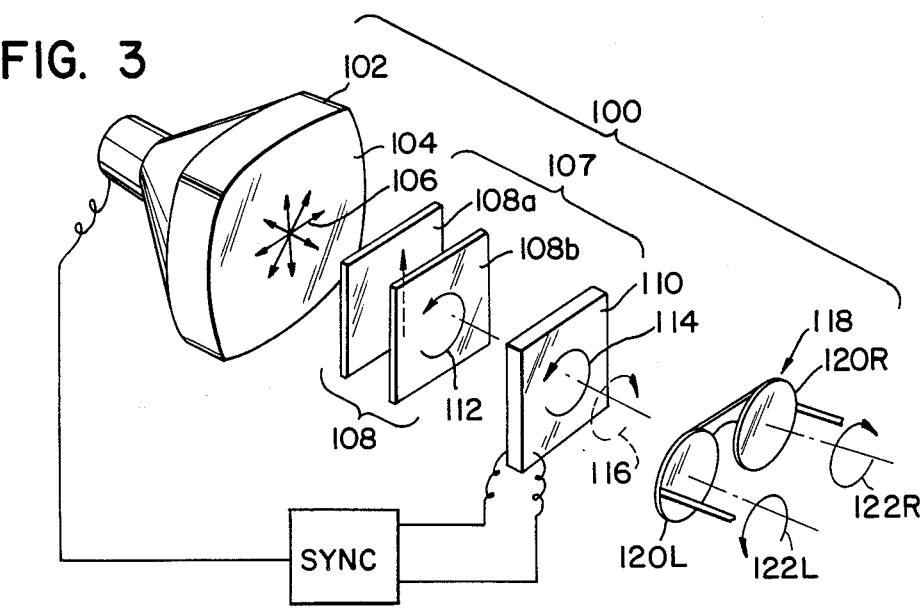
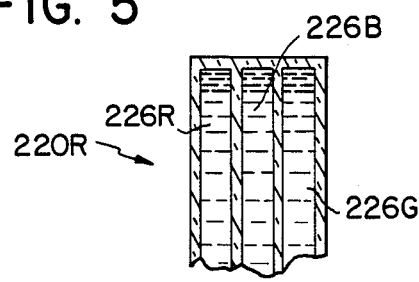
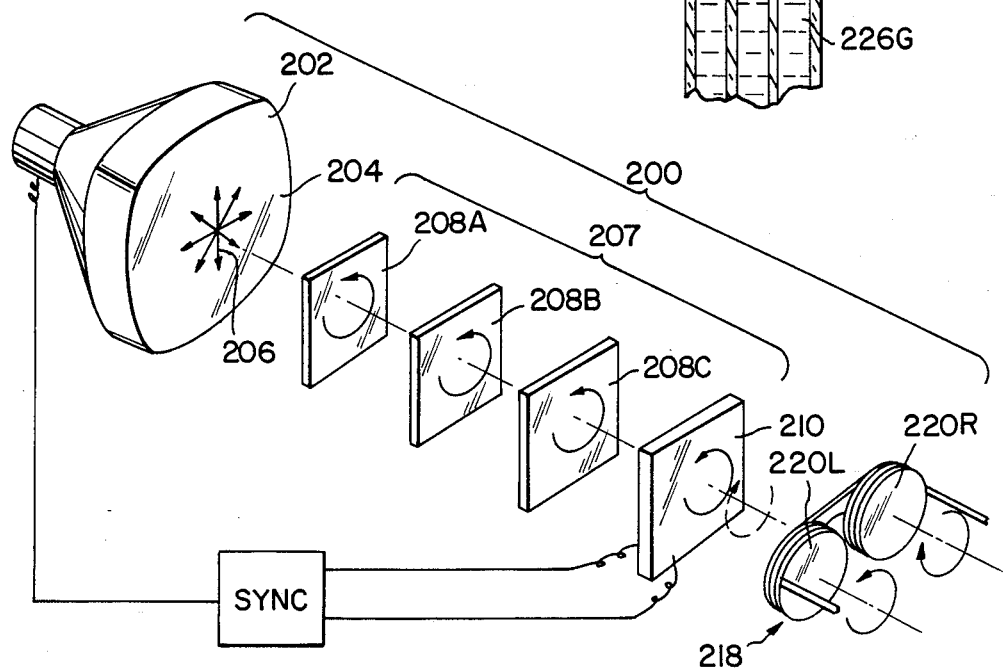

STEREOSCOPIC DISPLAY

BACKGROUND OF THE INVENTION

1. Field of the Invention:

This invention pertains to stereoscopic viewing systems in general, and in particular, to a high efficiency, stereoscopic display capable of producing color images.

2. Description of the Related Art:

An observer with normal binocular vision sees a slightly different perspective of a real-world, three-dimensional scene with each eye. This relative perspective shift between eyes is a function of the scene object distance and results in a perception of depth in the scene by the observer.

Over the years, various techniques have been developed to present a three-dimensional scene to an observer utilizing a two-dimensional format. These typically involve the display, either simultaneously or time-sequentially, of a pair of two-dimensional images corresponding to right-eye- and left-eye-perspective views of a three-dimensional subject, which images are each "encoded" with right-eye or left-eye information that permits them to be seen only by an eye equipped with, or shuttered by, an appropriate "decoder".

A well-known example is the "stereoscope" viewer, known since Victorian times, which first records a pair of static, two-dimensional images, usually photographs, corresponding to right-eye and left-eye perspectives of a three-dimensional scene in fixed, side-by-side relationship, and then presents them for viewing through apparatus which confines the vision of each eye of the viewer to the appropriate, corresponding image using optics. An improved form of this device is available today in most toy shops.

Another technique which has been used to present moving scenes, as in motion pictures, involves recording the right-eye and left-eye perspectives in different colors on the same frame of film, then viewing the projected frame through eyewear comprising a pair of color filters, each of which is disposed within the eyewear to pass the appropriate image to a corresponding right or left eye and to block reception by that eye of the other, simultaneously-presented, but differently-colored image.

A variation of this technique is to record the right-eye and left-eye perspectives on superposed sheets of orthogonally polarized dichroic polarizing materials, and then to view the perspectives projected simultaneously onto a non-depolarizing screen through eyewear having a pair of orthogonally polarized lenses. A description of the two foregoing techniques, along with a modification of them said to be more suitable for presenting stereoscopic images for viewing on television, is presented in U.S Pat. No. 4,431,265 to Benton.

Wilkins, in U.S. Pat. No. 4,559,556, describes polarizing eyewear useable with a method of split-screen image presentation in which the right-eye and left-eye perspectives are presented simultaneously in an "over-and-under", orthogonally polarized fashion on a television screen for viewing.

In U.S. Pat. No. 4,583,117, Lipton et al. describe a similar "over-and-under" type of image presentation in which a pair of conventional videocameras are modified to utilize only half of the horizontal sweep lines to form the perspectives, which are then presented time-sequentially. Electronically shuttered and synchronized eyewear is employed to view the scenes without flicker.

"Shuttering" can be accomplished either mechanically or electro-optically. The latter technique is typically based on liquid crystal devices. A liquid crystal shutter consists of a sandwich of a first plane polarizer, an active liquid crystal device, and an "analyzer", i.e., a second plane polarizer. In one voltage state, the liquid crystal device is optically neutral, and in a second state, serves to rotate the plane of polarization of light transmitted through it by 90°. By appropriate initial alignment of the axes of polarization of the three elements, the shutter can be thereafter electrically switched between "open" and "closed" conditions.

A pair of goggles employing two such shuttering devices over each eye and synchronized by means of a cable interconnecting them to a display of sequentially-presented right-eye and left-eye images is described by Roese in U.S. Pat. No. 4,021,846.

It is possible to split the shutter and to position the first polarizer and liquid crystal device in front of the image generating device. In such a configuration, the two elements, when switched synchronously with the sequential image display rate, operate as a "switchable polarizer" to polarize right-eye and left-eye images alternately in orthogonal directions, to be analyzed appropriately by the the second polarizer, worn by the observer as a pair of polarizing spectacles having orthogonal axes of polarization. Stereoscopic displays employing such a technique are discussed by Bonne in U.S. Pat. No. 3,858,001 and by Byatt in U.S. Pat. No. 4,281,381.

In U.S. Pat. No. 4,670,744, Buzak describes an entirely different means for displaying a three-dimensional image using a cathode ray tube ("CRT") to sequentially project a series of images corresponding to different depth planes of a three-dimensional subject. These images are then selectively transmitted or reflected from appropriate positions along an optical path by means of a plurality of "light direction modulators", which are notable for their use of "chiral cells", i.e., cholesteric liquid crystal cells, and circularly-polarized light, to achieve the desired reflections and transmissions.

It is to be noted that the foregoing art has timely application in the field of avionics, wherein visual information of a type useful to a pilot or electronics warfare operator, such as navigation, fire-control, or threat-environment information, can be displayed in three-dimensions and within the context of the pilot's or operator's three-dimensional view of the real world.

However, the prior art techniques discussed above present certain problems in terms of their practical utilization in an avionics system. For example, those which employ shutter elements in the operator's eyewear are bulky and clumsy to wear, have a low see-through transmission (less than about 20%), and must be tethered to the display by means of a cable or radio signal to carry the synchronizing signals.

Those which use colored eyewear also transmit relatively low levels of light and present a view of the real world that is both dim and strangely colored.

Even those which employ eyewear consisting of a simple pair of "clear", linear polarizers with crossed polarizing axes are not without such problems because, (1) the latter are still capable of transmitting only about 40% of the incident real world light to the operator's eyes, a level that is considered unacceptable in many avionics applications where high "real world" situational awareness must be maintained, and (2) it is difficult to keep the first polarizer element and the "analyzer" elements properly oriented with respect to each other, particularly when the observer's head is subject to being tilted sideways, as in a maneuvering airplane. Such disorientation can cause loss of shutter efficiency and create "ghosting" on the display in which the ghost image is seen by the "wrong" eye.

Displays which synthesize three-dimensional images from a plurality of depth planes lack sufficient definition unless a large number of such planes are generated, leading to very complicated and expensive displays.

The present invention teaches a way to overcome these problems in a three-dimensional display that is well suited to avionics applications and may be provided in either monochromatic or full-color embodiments.

SUMMARY OF THE INVENTION

A monochromatic embodiment of a preferred stereoscopic display of the present invention comprises means for sequentially projecting alternate ones of succesive pairs of substantially monochromatic light images corresponding to right-eye-and left-eye-perspective views of a three-dimensional scene toward an observer at rate of at least about 120 images per second. These images are then circularly polarized in alternately opposite senses by variable polarizer means operated synchronously with the projector means. The images are analyzed, or decoded for viewing by the appropriate eye of the observer, by eyewear comprising a pair of highly transmissive, cholesteric liquid crystal circular polarizers of opposite senses, each "tuned" to the particular wavelength or color of the monochromatic images.

In an alternate, high-brightness embodiment, the variable polarizer comprises a cholesteric liquid crystal circular polarizing element which is also tuned to the wavelength of the images, in combination with a nematic liquid crystal half-wave retarder cell which is switched synchronously with the image display rate.

In yet another preferred, multicolored embodiment of a stereoscopic display, the cholesteric liquid crystal elements in the eyeware and in the variable polarizer are replaced by a "stack" of such elements equal in number to the number of colors used to form the images and each tuned to a different one of the colors. In the case of a full-color display, each such stack includes three such elements, each tuned to one of the primary colors used to form the images.

A better understanding of the stereoscopic display of the present invention will be obtained from a consideration of the following detailed description of some exemplary preferred embodiments thereof, particularly when read in conjunction with the figures of the accompanying drawings, a brief description of which now follows.

BRIEF DESCRIPTION OF THE DRAWINGS

FIG. 3 is an expanded, isometric, schematic view of a preferred embodiment of a stereoscopic display in accordance with the present invention;

FIG. 4 is an expanded, isometric, schematic view of an alternate preferred embodiment of a stereoscopic display in accordance with the present invention; and FIG. 5 is an enlarged cross-sectional view into one of the eyewear elements of the present invention, as revealed by the section 5—5 taken in FIG. 4.

DETAILED DESCRIPTION OF THE PREFERRED EMBODIMENTS

Figure 1:
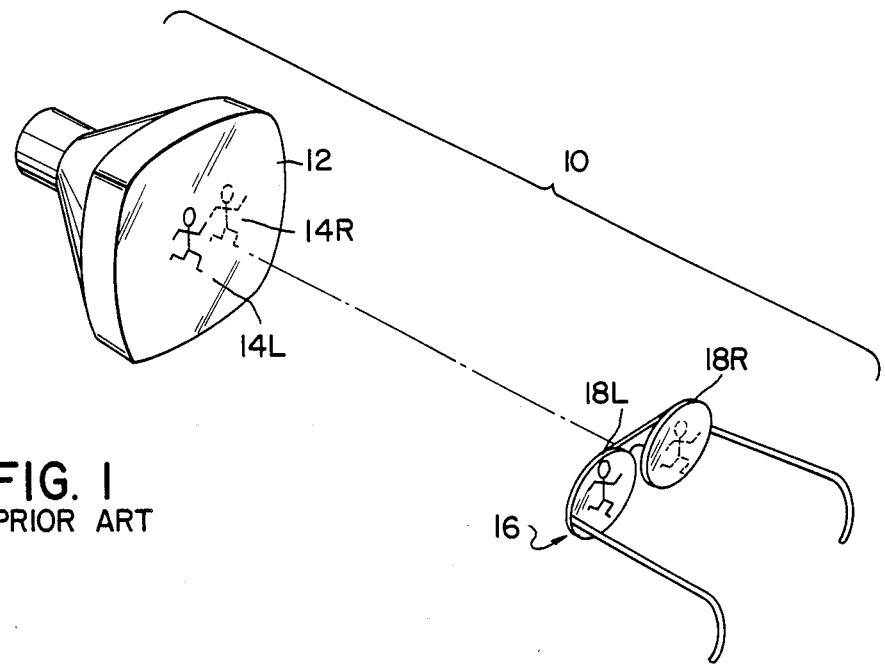
FIG. 1 is an isometric, schematic view of a stereoscopic display of the prior art.

A prior art display 10 of a type discussed above is illustrated diagrammatically in FIG. 1, and comprises means 12, such as the CRT illustrated, for projecting, either simultaneously or sequentially, successive pairs of apparently superimposed images 14R and 14L corresponding respectively to right-eye- and left-eye-perspective views of a three-dimensional subject.

In one such known system, the images are projected simultaneously and are "coded" to a corresponding eye of the observer by coloring them each a different color, e.g., red for the lefteye image 14L, and blue for the right-eye image 14R. The observer is provided with eyewear 16 containing a pair of "decoding" elements comprising a red filter 18R positioned over the right eye and and a blue filter 18L positioned over the left eye. The color filters block correspondingly-colored images so that the eyes see only their appropriate perspectives, which are then integrated in the observer's brain to produce the perception of depth. Such a display is described in U.S. Pat. No. 4,431,265 to Benton.

A modified form of the display 10 can be obtained by projecting the image pair 14R, 14L in monochrome or color, and encoding them for their corresponding eyes by linearly polarizing them in othogonal directions. This may be accomplished, for example, by using the split screen technique described by Wilkins in U.S. Pat. No. 4,559,556, in combination with a pair of polarizing layers fitted appropriately to the screen of the CRT 12. The images are then analyzed by eyewear 16 containing a pair of plane polarizers 18R and 18L having their axes of polarization in alignment with the respective axes of their corresponding polarized images. Each polarizer acts to pass a correspondingly-polarized image and to block an orthogonally-polarized image. It is to be noted that, when the split screen technique is employed, additional optics ar necessary within the eyewear 16 to converge the split images into a single, whole image.

Figure 2:
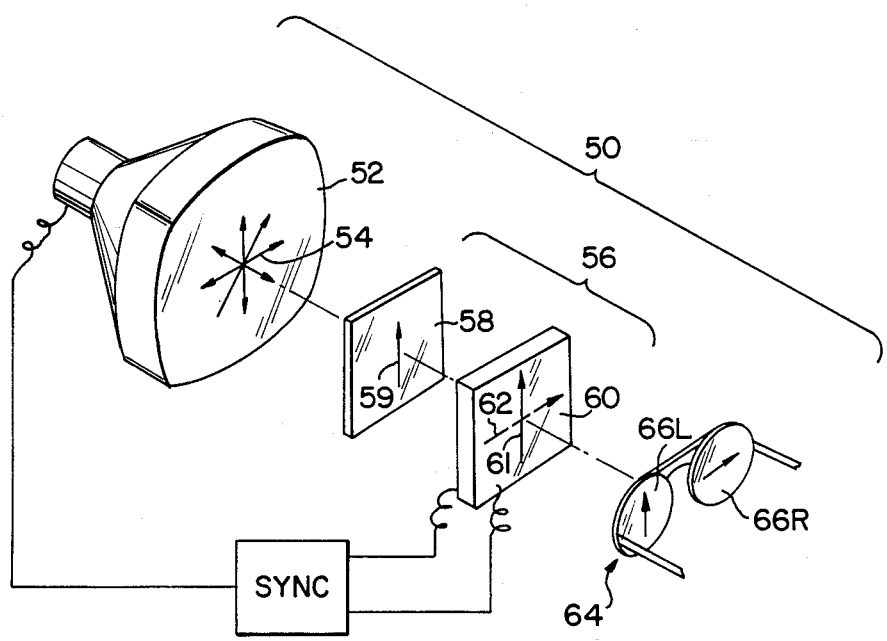
FIG. 2 is an expanded, isometric, schematic view of another kind of prior art stereoscopic display.

In FIG. 2, another form of a known stereoscopic display system 50 is illustrated of a type described by Bonne in U.S. Pat. No. 3,858,001 and by Byatt in U.S. Pat. 4,281,341, and to which the display of the present invention is more closely related.

The display system 50 comprises an image projection means 52, e.g., a CRT, capable of sequentially projecting non-polarized right-eye and left-eye images 54 at a rate sufficient to avoid a perception of flicker, i.e., an image rate of 120 Hz or greater, or a frame rate (consisting of a right-eye field plus a left-eye field) of at least 60 Hz.

A "switchable polarizer" 56 is disposed in front of the CRT to receive the images, where they first pass through a planepolarizing layer 58 of a known type, and are thereby linearly polarized in a plane indicated by the arrow 59.

Disposed adjacent to the front of polarizer 58 is a twisted nematic liquid crystal cell 60 of a known type. The liquid crystal cell has two states: "ON" and "OFF", obtained by imposing a distributed high or low voltage field, respectively, across the liquid crystal material. By convention, the ON state can be described as optically neutral, while the OFF state causes polarized light transmitted by the cell to be rotated by 90°.

Thus, unpolarized images passing through both the polarizer 58 and the liquid crystal cell 60 while the cell is ON emerge therefrom linearly polarized in the plane indicated by the solid arrow 61, while images passing through them while the cell is OFF emerge polarized in a plane normal to the first plane, as indicated by the dotted arrow 62.

Electronic means, labelled "SYNC" in FIG. 2, synchronize the switching of the cell 60 with the image projection rate of the CRT 52 so that the right-eye and left-eye images are appropriately coded with orthogonal polarizations for analysis by the eyewear 64, which contains a pair of linear polarizers 66R, 66L, each with an axis of polarization in alignment with one of the orthogonal axes of polarization 61 or 62 of the two images.

If the switchable polarizer 56 adjacent to the CRT 52 were replaced with a pair of smaller such devices located within the eyewear 64, one in front of each of the polarizers 66R and 66L, a form of shuttered goggles of the type described by Roese in U.S. Pat. No. 444,021,846 would result.

While each of the prior art displays discussed above in connection with FIGS. 1 and 2 has some features that are applicable to an avionics stereoscopic system, they also possess some drawbacks.

Analyzing eyewear that utilizes differently-colored filters tints the pilot's view of the actual environment to a degree that is unacceptable, and additionally has relatively poor light transmission.

Displays incorporating linear polarizers, while capable of transmitting color fairly accurately, provide an unacceptably-low transmission of light. For example, the shuttered goggles described above are not only bulky to wear and require a "tether" in the form of a synchronizing cable, but are also not capable of transmitting more than about 20% of the total light incident upon them. While eyewear consisting of only a pair of plane polarizers, such as those illustrated in FIG. 2, are less restrictive to wear and will transmit up to 40% of incident light, this figure is still considered too low for most avionics applications. Finally, they have low tolerance for misalignment between their axes and that of a remotely-located first polarizer, such as would be caused by a cocking or tilting of the pilot's head.

An exemplary first preferred embodiment of a stereoscopic display 100 capable of overcoming these disadvantages is illustrated in FIG. 3. The display 100 comprises a CRT 102 having a screen 104 coated with a rare earth (narrow emission band) phosphor layer which emits visible, substantially monochromatic light having a relatively sharp emission peak at a wavelength of about $L_o$ when struck by an electron beam from the CRT's gun.

Means are provided to "paint" the screen 104 with an electron beam from the gun such that alternate ones of successive pairs of substantially monochromatic, unpolarized images 106, corresponding to right-eye- and left-eye-perspective views of a three-dimensional subject or scene, are projected from the screen at a rate of at least about 120 images per second to avoid flicker.

The display 100 also includes a variable polarizer 107 similar to that of some prior art displays, except that it comprises a circular polarizer 108, which includes a linear polarizer 108a having an optic axis, and a quarter wave plate 108b which has a "slow" axis set at 45° with respect to the polarizer's axis, so that the pair together functions as a circular polarizer. The circular polarizer 108 may be constructed as either a right-hand-circular-polarizer (RHCP) or a left-handcircular-polarizer (LHCP), as illustrated, and acts on the image 106 from the CRT 102 to polarize it circularly in the same sense, or "chirality", as that of the polarizer.

The variable polarizer 107 also comprises a birefringent nematic liquid crystal cell 110 which is disposed in front of the circular polarizer 108. The nematic liquid crystal cell 110 also has a slow axis and is used as a variable "retarder" plate, i.e., one whose differential retardation between fast and slow axes is variable between zero and a half wave, depending on the voltage applied across it. Thus, by convention, when the retarder plate is ON (high voltage applied), the plate is optically neutral, and a right-handed-circularly-polarized image 112 (solid arrow) emerging from the polarizer 108 will be transmitted through the optically-clear retarder plate 110 as the RHCP image 114 with its polarization unaffected (solid arrow). In the OFF state (low voltage applied), the retarder plate 110 is adjusted to be a half-wave retarder, and the image 112 is transformed by it to a LHCP image 116 (dotted arrow).

Thus, when the variable retarder 110 is switched between its OFF and ON states synchronously with the image projection rate of the CRT 102 by means of the block labelled "SYNC", the right-eye and left-eye perspectives emerge from the variable polarizer 107 encoded with circular polarizations of opposite senses.

In the exemplary first preferred embodiment illustrated, the eyewear 118 utilized to decode or analyze the right-hand and left-hand perspectives for their corresponding eyes comprise a pair of cholesteric liquid crystal elements 120R and 120L "tuned" to the particular color or wavelength of the images. By "tuned", it is meant that the layer of cholesteric liquid crystal material in the elements is adjusted to have a refractive index of n and a pitch of p, where $n \cdot p \simeq L_o$, the wavelength of the images.

A cholesteric liquid crystal functions as an efficient circular polarizer of light of wavelengths at or near $L_o$. Thus, in the spectral region near $L_o$, only one sense of circularly polarized light at or near $L_o$ is transmitted, while circularly polarized light of the opposite sense at or near $L_o$ is reflected. Light of other wavelengths is unaffected by the cholesteric layer. Since the direction of twist of the cholesteric liquid crystal material can be made either right-handed or left-handed, the cholesteric can be made into either a RHCP or a LHCP. By convention, the former has a film or layer which reflects right-handed-circularly-polarized light and transmits, with high efficiency, left-handed-circularly-polarized light, while the latter functions in just the opposite manner.

Thus, the eyewear 118 of the exemplary embodiment illustrated in FIG. 3 comprises a cholesteric liquid crystal RHCP for one eye and a LHCP for the other, both tuned to $L_o$, the emission peak of the CRT's phosphor. Where the right-eye images are circularly polarized in the right-hand direction and the left-hand images polarized opposite thereto, the right-eye element 120R will comprise a LHCP and the left-eye element 120L a RHCP.

When ambient surroundings are viewed with the cholesteric eyewear 118, light transmission is close to 100%, except for the set of wavelengths near $L_o$, where transmission is near 50%, due to the nearly-perfect transmission of one sense of circular polarization and nearly-perfect reflection of the other. In this regard, the cholesteric elements 120R and 120L may be thought of as very narrow passband, or "notch", filters centered on the frequency $f_o=c/L_o$. Since the active range around $L_o$ can be kept quite narrow, high overall light transmission results, thus overcoming one of the major drawbacks of the prior art. The resulting eyewear 118 appears virtually clear, can be made very light in weight, e.g., as a pull-down visor in a pilot's helmet, and requires no electronic tether to the CRT.

It should be further noted that, since the polarizers used in the variable polarizer 107 and the eyewear 118 are circular polarizers, cocking of the observer's head to either side will not result in any misalignment of their respective axes, and the "ghosting" problem of the prior art displays discussed above is also overcome.

An alternative embodiment, comprising a high-brightness display, is achieved by replacing the circular polarizer 108 in the variable polarizer 107 with a cholesteric liquid crystal plate, similar to the ones in the eyewear 118, which is also tuned to the emission peak $L_o$ of the CRT's phosphor. This results in a significant increase in the amount of light reaching the observer from the CRT, making the display more suitable for, e.g., high ambient light conditions.

Yet another exemplary alternative embodiment, a multicolor or full color stereoscopic display 200, is illustrated schematically in FIG. 4, with element similar to those in FIG. 3 numbered correspondingly, plus 100. The display 200 comprises a CRT 202 having a screen 204 with a matrix of rare earth phosphor elements deposited on it, each one capable of emitting light of different one of a plurality of narrowband colors when irradiated with electromagnetic energy, e.g. an electron beam.

For a full color display, the phosphor elements can be deposited on the screen 204 in adjacent groups, e.g., conventional triads, of primary-colored phosphor elements, i.e., Red, Blue and Green, and conventional television techniques employed to generate a full color, right-eye and left eye image pairs or frames 206, each image or field consisting of the sum of three monochromatic, primary-colored image components.

The high brightness, full color variable polarizer 207 uses a variable retarder plate 210 identical to that discussed in connection with the first embodiment, as well as a "stack" of individual cholesteric liquid crystal circular polarizers 208A, 208B and 208C, equal in number to the number of different image primary colors, each tuned to a different one of the primary colors of the image components. In the exemplary embodiment illustrated, three LHCP's are illustrated, respectively tuned to the colors red, green and blue. Thus, the encoding of right-eye and left-eye images with their respective oppositely-sensed polarizations within the variable polarizer 207 can be seen to occur on a monochromatic component-by-component basis.

The analyzing eyewear 218 used in the display 200 includes right-eye and left eye analyzers 222R and 222L, and likewise comprises "stacks" of pairs of oppositely-sensed cholesteric liquid crystal polarizers, each pair within the stack tuned to one of the color components and disposed within the eyewear to transmit appropriately encoded images to their appropriate eyes, and to reflect inappropriately encoded images therefrom. An enlarged, partial cross section through the right eye analyzer 222R is shown in FIG. 5, and comprises three cholesteric liquid material layers or films 226R, 226B and 226G, corresponding to right-eye analyzers tuned to the colors red, blue and green, respectively.

Those skilled in the art will recognize that various modifications in terms of materials, construction and procedure are possible in the embodiments discussed and illustrated hereinabove. For example, in a heads-up-display application, it may be desirable to invert the CRT and variable polarizer and rotate them 90° relative to a pilot's forward line of sight. If a halfsilvered mirror is then disposed at 45° to the line of sight between the variable polarizer and the analyzing eyewear, three-dimensional images can be displayed to the pilot within the context of the pilot's forward view.

Likewise, it is to be noted that the image source need not necessarily be a CRT, but can comprise any type of refreshed display panel, e.g., liquid crystal, light-emitting diode (LED), vacuum fluorescent, etc.

Other modifications are, of course, also possible. Accordingly, the embodiments discussed and illustrated herein should be taken as exemplary in nature only, and the scope of the instant invention limited only by the claims appended hereinafter.

What is claimed is:

1. A stereoscopic display, comprising:
   projector means for sequentially projecting, at a projection rate sufficient to avoid objectional flicker, alternate ones of successive pairs of substantially monochromatic images corresponding to right-eye- and left-eye-perspective views of a scene, each said image having a wavelength of about $L_o$;
   variable polarizer means operated synchronously with said projector means for circularly-polarizing alternate ones of said images in each said pair in opposite senses; and
   binocular eyewear, comprising:
      a pair of circular polarizing elements having opposite senses, each said element containing a cholesteric liquid crystal material having a refractive index of about n and a pitch of about p, where $n \cdot p \approx L_o$, and
      wherein said polarizing elements are each disposed within said eyewear to transmit corresponding ones of said polarized images to a corresponding eye, and to reflect oppositely-polarized ones of said images therefrom.

2. The display of claim 1, wherein said variable polarizer means further comprise:
   a circular polarizer disposed in front of said projector means to circularly polarize each of said images in a given sense; and
   a variable half-wave retarder plate disposed in front of said polarizer plate, said retarder plate having a slow axis, a layer of nematic liquid crystal material, and means for sequentially switching said plate between ON and OFF conditions synchronously with said projection rate such that in one of said conditions, said retarder plate transmits one of said images of each said pair with its polarization sense unaffected, and in the other of said conditions, transmits the other said image in each said pair retarded by one-half wave and thereby circularly polarized in the opposite sense.

3. The display of claim 2, wherein said circular polarizer further comprises:
   a linear polarizer having an optic axis; and
   a quarter wave plate having a slow axis set at 45° with respect to said linear polarizer's axis.

4. The display of claim 2, wherein said circular polarizer further comprises:
a layer of cholesteric liquid crystal material having a refractive index of about n and a pitch of about p, where $n \cdot p \simeq L_o$.

5. The display of claim 1, wherein said projector means further comprise means for sequentially projecting alternate ones of successive pairs of multicolored images corresponding to right-eye- and left-eye-perspectives of a multicolored scene at said projection rate, each said image comprising the sum of a number of differently colored, generally monochromatic image components, and wherein said eyewear further comprises a plurality of said pairs of said cholesteric elements equal in number to said number of differently colored image components, each said pair tuned to a different one of said image component colors.

6. The display of claim 5, wherein said variable polarizer means further comprises:
a stack of cholesteric liquid crystal circular polarizers equal in number to said number of differently colored image components disposed in front of said projector means, each said polarizer tuned to a different one of said colors of said image pairs; and
a variable half-wave retarder plate disposed in front of said stack, said retarder plate having a slow axis, a layer of nematic liquid crystal material, and means for sequentially applying alternate ones of a pair of high and low voltages across said layer synchronously with said projection rate such that, at one of said voltages, said retarder plate transmits one of said images from each said pair with its sense of polarization unaffected, and at a second voltage, transmits the other one of said images from each said pair of images retarded by one-half wave and thereby circularly polarized in the opposite sense.

7. The display of any one of claims 1–6, wherein said projector means further comprise a cathode ray tube having a narrowband, rare-earth phosphor layer, said layer having at least one peak emission of light at a wavelength of about $L_o$.

8. The display of any one of claims 1–6, wherein said projector means further comprise a liquid crystal display, a light-emitting-diode display, or a vacuum fluorescent display.

9. A method for displaying a three-dimensional scene to an observer, comprising the steps of:
sequentially projecting toward said observer alternate ones of successive pairs of generally monochromatic images corresponding to said observer's right-eye- and left-eye-perspective views of said scene at a projection rate sufficient to avoid a perception of appreciable flicker in either one of said images, each said image having a wavelength of about $L_o$;
sequentially polarizing said images circularly in alternately opposite senses synchronously with said projection rate; and
analyzing said images with a pair of cholesteric liquid crystal circular polarizers comprising a RHCP and a LHCP, each said polarizer having a refractive index of about n and a pitch of about p, where $n \cdot p \simeq L_o$, and wherein said elements are disposed, one in front of each one of said observer's eyes, within said eyewear to conduct corresponding ones of said polarized images to a corresponding eye of said observer, and to reflect oppositely-polarized images therefrom.

10. The method of claim 9, wherein the step of sequentially polarizing said images circularly in alternately opposite senses further comprises:
first, circularly polarizing each of said images in each said pair in a given sense; and
then, retarding one of said polarized images in each said pair by one-half wave such that said one image is circularly polarized in a sense opposite to said given sense.

11. The method of claim 10, wherein the step of circularly polarizing each of said images in a given sense further comprises the step of:
polarizing said images with a cholesteric liquid crystal circular polarizer containing a layer of cholesteric liquid crystal material having a refractive index of about n and a pitch of about p, where $np \simeq L_o$.

12. The method of either of claims 10 or 11, wherein the step of retarding one of said polarized images in each said pair by one-half wave further comprises the steps of:
passing said circularly polarized images through a layer of birefringent nematic liquid crystal material; and
applying a two-level, distributed voltage field across said layer synchronously with said projection rate such that, at one voltage level, one of said images in each said pair of circularly-polarized images is passed therethrough with its sense of polarization unchanged, and at a second voltage, the other one of said pair of circularly-polarized images is retarded by one-half wave and thereby circularly polarized with the opposite sense.

13. The method of claim 9, wherein the step of sequentially projecting alternate ones of said images further comprises the step of:
sequentially projecting alternate ones of successive pairs of multicolor images corresponding to right-eye- and left-eye-perspectives of a multicolored scene, each said image comprising the sum of a number of differently colored, generally monochromatic image components;
and wherein the step of analyzing said images with a pair of cholesteric liquid crystal polarizers further comprises the step of:
analyzing said images with a stack of said pairs of cholesteric liquid crystal elements equal in number to said number of differently colored image components, each said pair in said stack being tuned to a different one of said colors of said image components.

14. The method of claim 13, wherein the step of sequentially polarizing said images circularly in alternately opposite senses further comprises:
circularly polarizing each of said images in said given sense with a stack of said cholesteric liquid crystal circular polarizers equal in number to said number of differently colored image components, each said polarizer in said stack being tuned to a different one of said colors of said image components.

15. A stereoscopic display, comprising:
a cathode ray tube having a screen with a phosphor layer which emits relatively narrowband light at a wavelength of about $L_o$ when struck by an electron beam;
means for repetitively painting said screen with an electron beam such that alternate ones of successive pairs of light images corresponding to righteye- and left-eye-perspective views of a scene are sequentially emitted therefrom at a rate sufficient to avoid a perception of flicker in the images;

a circular polarizer containing a layer of highly transmissive cholesteric liquid crystal material having a refractive index of about n, and a pitch of about p, where $np \approx L_o$, disposed in front of said screen for circularly polarizing said images in a given sense;

a variable half-wave retarder plate disposed in front of said polarizer, said retarder plate containing a layer of bi-refringent nematic liquid crystal material and having means for sequentially applying alternate high and low voltages across said layer synchronously with said projection rate such that, at one voltage, one of said images in each said pair of circularly-polarized images passes through said retarder plate with its sense of polarization unaffected, and at a second voltage, the other one of said image in each said pair is retarded by one-half wave and thereby circularly polarized in the opposite sense; and binocular eyewear, comprising:

a pair of circular polarizing elements having opposite senses, each said element containing a highly transmissive cholesteric liquid crystal material having a refractive index of about n and a pitch of about p, where $n \cdot p \approx L_o$, and wherein said elements are disposed within said eyewear to conduct a corresponding one of each said pair of images to a corresponding eye, and to reflect the other images therefrom.

16. A high-efficiency, stereoscopic color display, comprising:

a screen having a matrix of rare-earth phosphor elements arrayed thereon in adjacent groups of up to three of said elements per group, each said element in each said group being capable of emitting light in one of up to three narrowband, primary colors such that the color of light emitted from each said group is adjustable through a substantial portion of the visible color spectrum;

means for selectively addressing selected ones of said elements with an electron beam such that alternate colored fields corresponding to right-eye- and left-eye-perspective views of a colored scene are sequentially emitted from said screen in successive frames consisting of two of said fields per frame at a display rate sufficient to avoid a perception of flicker, each said field comprising the sum of three monochromatic field components, each said component consisting of light of one of said primary colors;

a stack of up to three circular polarizers disposed in front of said screen for circularly polarizing each said field in a given sense, each said polarizer comprising a layer of cholesteric liquid crystal material tuned to a different one of said primary colors such that correspondingly-colored components of each said field is thereby circularly polarized in said given sense;

a variable half-wave retarder plate disposed in front of said stack of polarizers, said retarder plate containing a layer of birefringent nematic liquid crystal material and means for alternately applying high and low, distributed voltage fields across said material synchronously with said field display rate such that, in one voltage state, said circularly-polarized fields pass therethrough unaffected, and in the other voltage state, are retarded by one-half wave and thereby circurlarly polarized in the opposite sense; and independent binocular eyewear, comprising right-eye and left-eye analyzers, each said analyzer comprising a stack of up to three circular polarizers, each said polarizer in each said stack comprising a cholesteric liquid crystal layer tuned to a different one of said primary colors and disposed within a respective one of said stacks to pass a correspondingly-colored component of a corresponding one of said circularly polarized fields to a corresponding eye, and to reflect correspondingly-colored components of oppositely polarized fields therefrom.

17. The display of claim 16, wherein said three primary colors are red, blue and green.

* * * * *